US011374738B2

(12) United States Patent
Cran

(10) Patent No.: US 11,374,738 B2
(45) Date of Patent: Jun. 28, 2022

(54) METHODS AND SYSTEMS FOR GENERATING, RECORDING AND RETRIEVING DIGITAL TRANSACTION RECORDS

(71) Applicant: Make Great Sales Limited, Wanchai (HK)

(72) Inventor: Bruce Cran, Richmond (CA)

(73) Assignee: Make Great Sales Limited, Hong Kong (HK)

( * ) Notice: Subject to any disclaimer, the term of this patent is extended or adjusted under 35 U.S.C. 154(b) by 236 days.

(21) Appl. No.: 16/441,532

(22) Filed: Jun. 14, 2019

(65) Prior Publication Data

US 2019/0386818 A1    Dec. 19, 2019

Related U.S. Application Data

(60) Provisional application No. 62/686,591, filed on Jun. 18, 2018.

(51) Int. Cl.
*H04L 9/06* (2006.01)
*G06Q 30/02* (2012.01)

(52) U.S. Cl.
CPC ....... *H04L 9/0637* (2013.01); *G06Q 30/0224* (2013.01); *H04L 2209/38* (2013.01)

(58) Field of Classification Search
CPC ... H04L 9/0637; H04L 9/3247; H04L 9/3236; H04L 2209/38; H04L 2209/56; G06Q 30/0224; G06Q 20/065; G06Q 2220/00

USPC ....................................................... 713/168
See application file for complete search history.

(56) References Cited

U.S. PATENT DOCUMENTS

| | | | | |
|---|---|---|---|---|
| 7,924,989 | B1 * | 4/2011 | Cooper | H04M 3/533 |
| | | | | 379/90.01 |
| 10,833,843 | B1 * | 11/2020 | Vijayvergia | H04L 9/3242 |
| 2004/0054591 | A1 * | 3/2004 | Spaeth | G06Q 30/0226 |
| | | | | 705/14.27 |
| 2007/0180031 | A1 * | 8/2007 | Stern | G06Q 10/107 |
| | | | | 709/206 |
| 2008/0011837 | A1 * | 1/2008 | Wesley | G06Q 30/0238 |
| | | | | 705/14.1 |
| 2010/0185656 | A1 * | 7/2010 | Pollard | G06F 21/31 |
| | | | | 707/769 |
| 2011/0246273 | A1 * | 10/2011 | Yarvis | G06Q 30/0615 |
| | | | | 713/168 |

(Continued)

*Primary Examiner* — Kambiz Zand
*Assistant Examiner* — Mahabub S Ahmed
(74) *Attorney, Agent, or Firm* — Cochran Freund & Young LLC; William O'Meara

(57) ABSTRACT

Methods and systems are disclosed for recording a transaction between a user and a transaction system on a distributed ledger maintained by nodes interconnected over a peer-to-peer (P2P) network. Where the user has opted in, a block for the transaction is generated with the user's key and is broadcast to the P2P network for validation and entry on the distributed ledger. Where the user has not opted in, device information associated with the transaction is obtained, and a block for the transaction is generated by the device information and is broadcast to the P2P network for validation and entry on the distributed ledger. The device information may be used to locate, retrieve and claim the records of past transactions by the user on the distributed ledger.

8 Claims, 4 Drawing Sheets

(56) References Cited

U.S. PATENT DOCUMENTS

| | | | |
|---|---|---|---|
| 2012/0036360 A1* | 2/2012 | Bassu | H04L 9/3228 713/168 |
| 2012/0209783 A1* | 8/2012 | Smith, Jr. | G06Q 20/384 705/308 |
| 2012/0254320 A1* | 10/2012 | Dove | G16H 40/67 709/204 |
| 2012/0271808 A1* | 10/2012 | Westphal | G06Q 30/0257 707/706 |
| 2013/0103578 A1* | 4/2013 | Mallean | G06Q 20/3827 705/39 |
| 2013/0290711 A1* | 10/2013 | Rajkumar | H04L 9/3226 713/168 |
| 2013/0304570 A1* | 11/2013 | Johnson | G06Q 30/02 705/14.66 |
| 2014/0189107 A1* | 7/2014 | Kalavade | H04L 51/063 709/224 |
| 2014/0273981 A1* | 9/2014 | Steinbach | H04W 4/14 455/414.1 |
| 2014/0278991 A1* | 9/2014 | Sandoval | G06Q 30/0257 705/14.55 |
| 2015/0186536 A1* | 7/2015 | Bosworth | G06F 16/48 707/754 |
| 2017/0178174 A1* | 6/2017 | Mitchell | G06Q 30/0226 |
| 2017/0180797 A1* | 6/2017 | Splaine | H04N 21/6125 |
| 2018/0082024 A1* | 3/2018 | Curbera | H04L 9/3236 |
| 2018/0109541 A1* | 4/2018 | Gleichauf | H04W 12/06 |
| 2018/0144050 A1* | 5/2018 | Whillock | H04L 63/104 |
| 2018/0158129 A1* | 6/2018 | Kohli | G06Q 30/0633 |
| 2018/0218400 A1* | 8/2018 | Kerns | G06Q 30/0256 |
| 2019/0019208 A1* | 1/2019 | Postrel | H04L 63/102 |
| 2019/0028277 A1* | 1/2019 | Jayachandran | H04L 9/3239 |
| 2019/0108542 A1* | 4/2019 | Durvasula | G06Q 20/065 |
| 2019/0149625 A1* | 5/2019 | Garon | H04L 67/20 709/224 |
| 2019/0180266 A1* | 6/2019 | Sidhu | H04L 9/3239 |
| 2019/0238316 A1* | 8/2019 | Padmanabhan | H04L 9/0637 |
| 2019/0238525 A1* | 8/2019 | Padmanabhan | H04L 63/08 |
| 2019/0238550 A1* | 8/2019 | Zhang | H04L 63/20 |
| 2019/0294822 A1* | 9/2019 | Hennebert | H04L 9/3213 |
| 2019/0306128 A1* | 10/2019 | Kothavale | H04L 9/3228 |
| 2019/0342336 A1* | 11/2019 | Finkelstein | G06F 21/6245 |
| 2019/0372770 A1* | 12/2019 | Xu | H04L 9/0643 |
| 2020/0051117 A1* | 2/2020 | Mitchell | G06Q 30/0239 |
| 2020/0134206 A1* | 4/2020 | Thekadath | G06F 16/27 |
| 2020/0387923 A1* | 12/2020 | Mitchell | G06Q 20/12 |

* cited by examiner

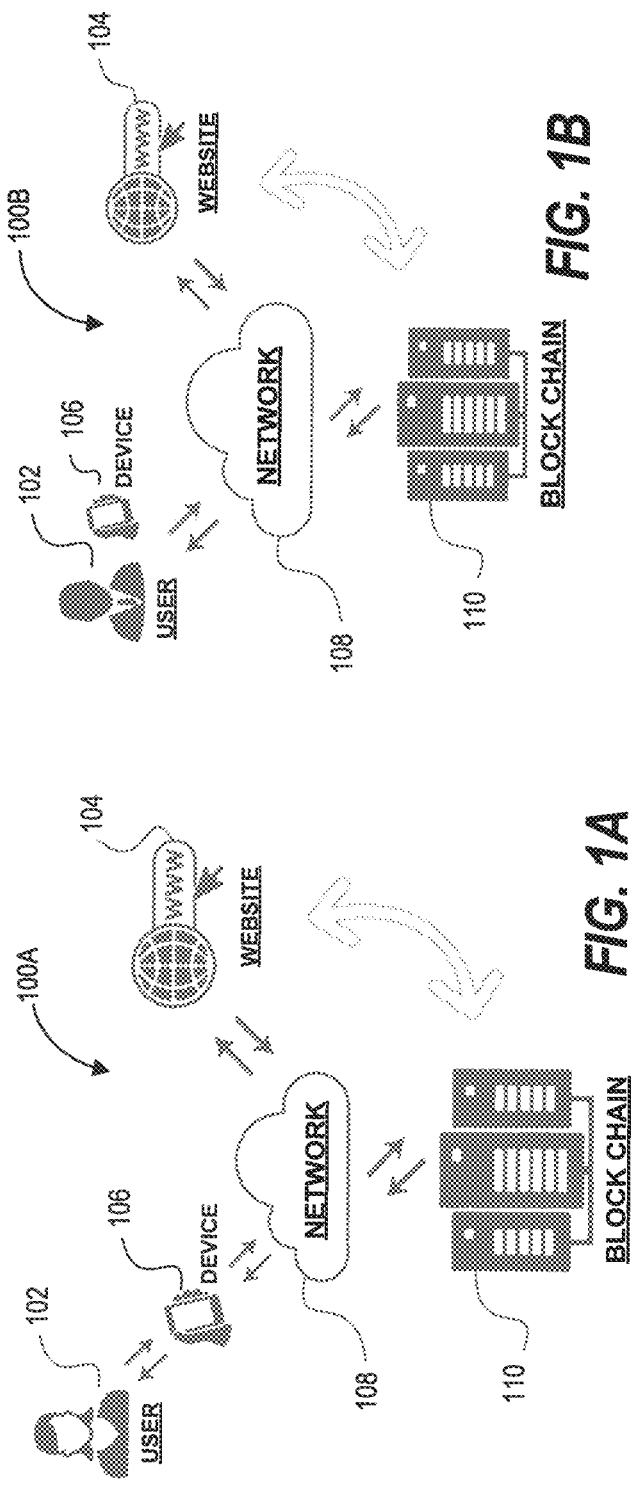
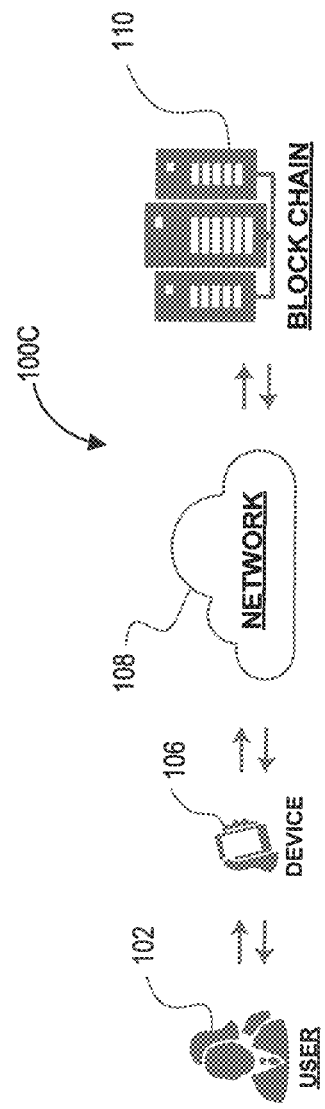
FIG. 1A
FIG. 1B
FIG. 1C

METHODS AND SYSTEMS FOR GENERATING, RECORDING AND RETRIEVING DIGITAL TRANSACTION RECORDS

RELATED APPLICATIONS

This application claims priority from U.S. Provisional Patent Application No. 62/686,591 filed on Jun. 18, 2018 entitled "METHODS AND SYSTEMS FOR GENERATING, RECORDING AND RETRIEVING DIGITAL TRANSACTION RECORDS". This application claims the benefit under 35 USC 119 of U.S. Provisional Patent Application No. 62/686,591 filed Jun. 18, 2018 entitled "METHODS AND SYSTEMS FOR GENERATING, RECORDING AND RETRIEVING DIGITAL TRANSACTION RECORDS", which is incorporated herein by reference in its entirety.

TECHNICAL FIELD

This present disclosure relates generally to distributed ledger technologies (DLT), and more particularly to methods and systems for generating, recording and retrieving digital records as carried out by a computing system in a distributed computing environment.

BACKGROUND

Merchants may employ loyalty programs as a strategy to promote customer loyalty by encouraging customers to purchase or use the merchants' goods or services. Typically, these programs are structured to track customer purchases and activity, and allow customers to acquire reward points. The reward points can then be exchanged by the customers for rewards. Such rewards may include the provision of free goods or services to the customer, or the customer earning the right to apply a discount on purchases of goods or services. Reward points may be considered as a form of virtual currency in that it is a means of payment that can be transferred, stored or traded electronically.

Loyalty programs require data management systems to record, compile and store customer data, including data concerning a customer's purchase history and activity. The systems may also analyse the customer data to determine the rewards to offer to a customer. Such customer data is generally owned by the merchant and/or other third parties such as advertisers and third party loyalty program providers. As such, the customer is typically unable to control the use of its customer data.

In conventional loyalty programs, the customer is generally given the choice to opt in to a loyalty program. If the customer decides not to opt in, their transactions and other activity are not linked to the customer. Therefore, neither the customer nor the merchant is able to monetize or benefit from the customer's purchase history prior to the customer opting in.

There is a need for methods and systems for recording transactions which address or ameliorate one or more of the aforementioned disadvantages.

SUMMARY OF THE DISCLOSURE

In general, the present specification describes methods and systems for generating, recording and retrieving digital records within a distributed computing environment. Particular embodiments can be used to record transactions between customers and merchants, and enable customers to have some control over the use and disclosure of the recorded customer data, and with the option of providing only limited identifying information to the merchant. The records may be used to administer loyalty programs which capture past transactions and provide incentives for customers to retrieve and claim previous transactions.

One aspect of the invention relates to a method for recording a transaction between a user and a transaction system. The method comprises receiving transaction information for the transaction from the transaction system, and identifying whether the user has elected to opt in. Where the user has opted in, an assigned key for the user is received, and the transaction information and the key are transmitted to a distributed computing system for validation and entry on a distributed ledger maintained by the distributed computing system. Where the user has not opted in, device information associated with the transaction is received, and the transaction information and the device information are transmitted to the distributed computing system for validation and entry on the distributed ledger.

One aspect uses blockchain technology to provide the distributed ledger. In embodiments where the distributed ledger comprises a blockchain, transmitting the transaction information and the key to a distributed computing system comprises generating a block with the transaction information and the key, and broadcasting the block to the distributed computing system. In embodiments where the distributed ledger comprises a blockchain, transmitting the transaction information and the device information to a distributed computing system comprises generating a block with the transaction information and the device information, and broadcasting the block to the distributed computing system.

Where the user has not elected to opt in, the device information may be used to locate records of past transactions by the user on the distributed ledger. If the user elects to opt in at a later time, a key may be assigned to the user. Located records of past transactions may then be associated with the assigned key of the user.

Particular embodiments comprise obtaining a set of permissions associated with the transaction information, and applying the set of permissions to filter the transaction information to exclude data that the user does not consent to disclosing or recording, prior to transmitting it to the distributed computing system.

Another aspect of the invention relates to a system for recording a transaction between a user and a transaction system on a distributed ledger maintained by a distributed computing system. The system includes a user verification module operable to identify whether the user has elected to opt in; a permissions module operable to ascertain a set of permissions associated with the transaction information, and apply the set of permissions to filter the transaction information prior to communicating it to the distributed computing system; and a communications module operable to transmit the transaction information to the distributed computing system for validation and entry on the distributed ledger maintained by the distributed computing system.

In certain embodiments the communications module is configured to receive a key for the user where the user has opted in, and transmit the transaction information and key to the distributed computing system for validation and entry on the distributed ledger. In the case where the user has not opted in, the communications module is configured to receive device information associated with the transaction, and transmit the transaction information and the device information to the distributed computing system for validation and entry on the distributed ledger. The distributed ledger may be a blockchain. Where the distributed ledger is a blockchain, the communication module is operable to transmit the transaction information by generating a block with the transaction information and the key or the device information, and broadcasting the block to the distributed computing system. The device information recorded with the transactions may be used to locate records of past transactions by the user on the distributed ledger, at the election of the user at some later time.

Additional aspects of the present invention will be apparent in view of the description which follows.

BRIEF DESCRIPTION OF THE DRAWINGS

Features and advantages of the embodiments of the present invention will become apparent from the following detailed description, taken in with reference to the appended drawings in which:

FIGS. 1A, 1B and 1C (collectively, FIG. 1) illustrate different scenarios for a distributed computing environment according to the present invention;

DETAILED DESCRIPTION

Figure 2:
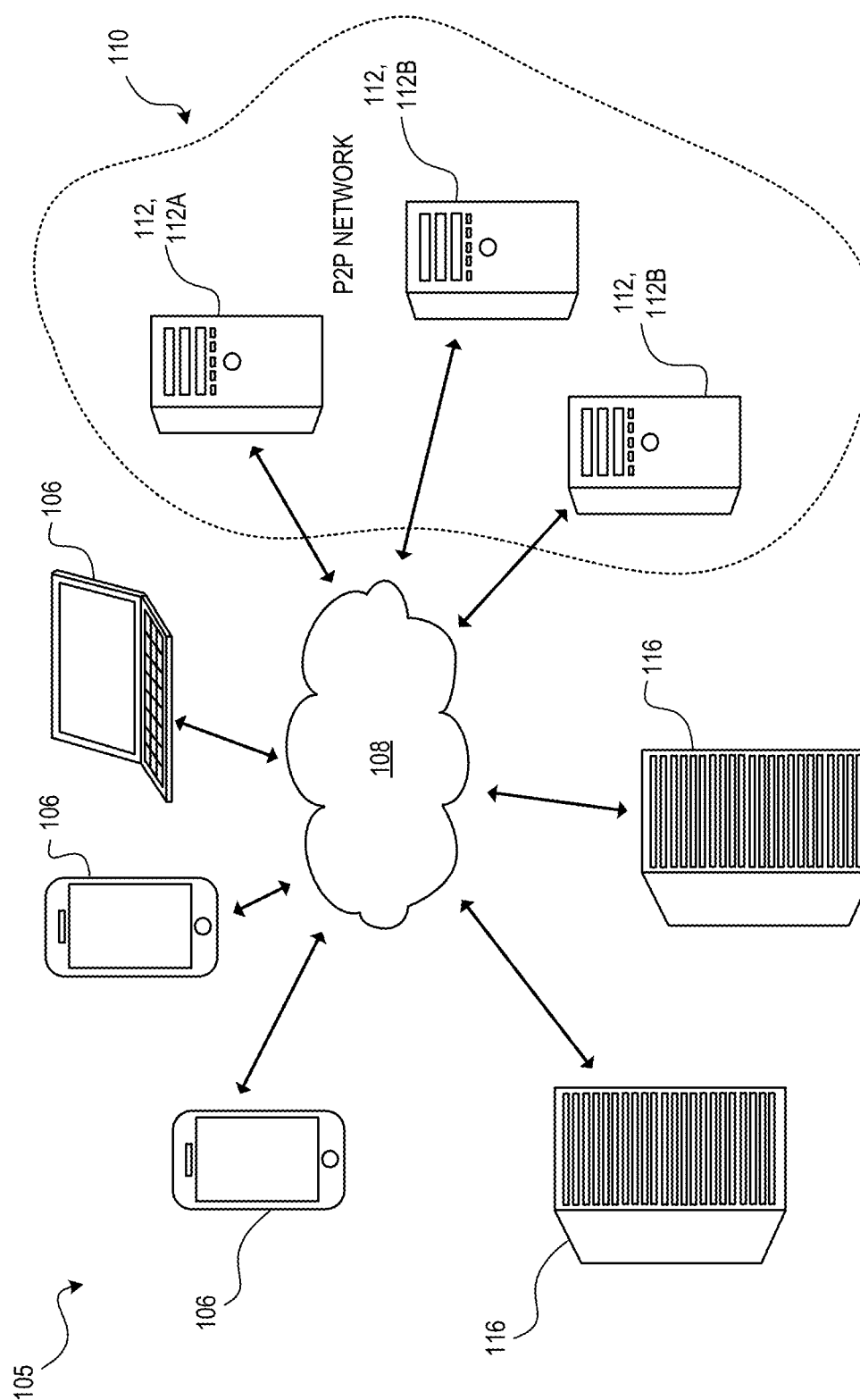
FIG. 2 is a schematic diagram of a distributed computing environment in accordance with one embodiment.

The description which follows, and the embodiments described therein, are provided by way of illustration of examples of particular embodiments of the principles of the present invention. These examples are provided for the purposes of explanation, and not limitation, of those principles and of the invention.

To benefit from a customer loyalty program, a customer is typically asked to opt in to the program. If the customer chooses to opt in, they consent to a merchant's use of their customer data, in exchange for the customer earning rewards points. For conventional loyalty programs, all of the customer data is typically owned by the merchant, and the opt-in is an "all or nothing" scenario wherein the customer who chooses to participate in a loyalty program does not have any control over how their customer data is associated with them, how much information is disclosed to the merchant, and how such information is used by the merchant.

If the customer does not opt in, no ledger of the customer's transactions is maintained. Although aggregate customer activity data may still be recorded by the merchant, transactions will not be associated with individual customers who have not opted in to the loyalty program. If the customer later changes their mind and wishes to participate in the loyalty program, they will only start earning their reward points from the point at which they joined the program. Any of the customer's purchases prior to that date will remain unassociated with the customer, as there is no mechanism to recover that data and associate them with the customer's profile. As a result, neither the customer nor the merchant may be able to benefit from the monetization of customer data prior to the opt-in date.

The present disclosure relates to methods and systems for recording customer data and giving control over customer data to the customer. In particular embodiments, distributed ledger technologies (DLT) are employed to record customer transactions on a data ledger. In a distributed ledger, the records are not maintained by a centralized authority or server. Data management is decentralized across multiple interconnected nodes of a distributed computing network. A "node", as used herein, encompasses a computer connected to a computer network or a distributed computing network. The terms "distributed computing network" and "distributed computing system" can be used interchangeably to describe an interconnected plurality of nodes operable to carry out a distributed computing task.

FIG. 1A illustrates a scenario 100A where a customer 102 who has opted in to a loyalty program engages in an online transaction with a merchant. The customer 102 is using a device 106, such as a smartphone, tablet, desktop or laptop computer, and the like, capable of connecting to the merchant's website or online transaction platform 104 by way of at least one or more networks (including, for example, the Internet), represented as network 108 in FIG. 1A. For example, customer 102 may use their device 106 to purchase a good or service from the merchant's online store at website 104, which is loaded onto a web browser displayed on device 106. Alternately, the customer may connect to the merchant's online transaction platform through another portal, such as a mobile application or other software application loaded onto device 106 which connects the device 106 to the merchant's online transaction platform over the network 108.

A plurality of nodes forming a distributed computing system 110 implements a distributed ledger for recording the transaction between the customer and the merchant. The nodes may participate in a consensus mechanism whereby they independently construct and/or validate a record of the transaction and vote as to whether to update the ledger with the record. If consensus is reached, the distributed ledger is updated and the agreed-upon version is saved on each node. The distributed ledger represents the aggregate customer purchase history. The distributed computing system 110 that provides the distributed ledger acts as a broker and intermediary between customers and merchants.

In some embodiments, if the customer has opted in (scenario 100A of FIG. 1A), the customer 102 is assigned a key that uniquely identifies the customer 102. Each time a transaction is made by the customer 102 using customer device 106, the customer's key is recorded with the transaction. The key may be used to locate transactions in the distributed ledger that are made by the customer 102 associated with the key.

Unlike conventional loyalty programs, particular embodiments of the invention comprise methods and systems to enable the retrieval and recovery of customer data, including the customer's purchase history, even where a customer has not opted in to a loyalty program. FIG. 1B illustrates a scenario 100B where the customer 102 has not opted in, and uses their device 106 to access the merchant's website 104 to purchase a good or service. Similar components as FIG. 1A's scenario 100A are referred to using similar reference numerals. Similarly to scenario 100A, in scenario 100B a distributed computing system 110 is used to record transactions between the customer 102 and the merchant's website 104. The data may be recorded on a distributed ledger through a consensus mechanism implemented by the nodes of the distributed computing system 110. As explained in further detail below, the data is recorded in a manner such that even if the customer 102 has not opted in, it is possible for a customer 102 to later recover and claim their past customer transactions once the customer 102 opts in to the program. This allows both customers and merchants to benefit from and share in the monetization of past customer data, while still giving control to the customer over the access and use of their customer data.

In particular embodiments of the invention, a business desiring access to customer data can present, to the customer, offers for rewards in exchange for the customer releasing the data to the business. The rewards may comprise free goods or services, or a discount to be applied to the purchase of goods or services. The rewards may also take other forms to incentivize the customer, such as enabling hassle-free returns or exchanges, offering free shipping on goods or services, or the delivery of value-added recommendations to the customer. The customer controls access to their customer data, by deciding whether or not to release their customer data to a third party. In particular embodiments, the customer also controls which portions of the customer data to release to the third party, and how this information is associated with the customer. The customers are therefore given control over aspects of the monetization and use of their customer data by third parties.

Exemplary applications for the foregoing technology include:
- a customer has purchased flights from a particular airline for a couple of years but never bothered to register for the airline's loyalty program; if the customer decides to join the airline's loyalty program at some later time, at the customer's election their prior purchasing activity is located in the distributed ledger and attributed to the customer, enabling the customer and the airline to share in the benefits of monetizing such data;
- a customer desires the benefits of a customer loyalty program from their frequent buying activity from an online store, but due to privacy considerations, they do not want to disclose their full details; the customer could provide their key and thereby supply only limited identifying information to the business, and the customer would be credited with the buying activity and earn rewards points through their key, all without having to disclose their full identity;
- customer data which previously would not have been able to be recovered and linked to a customer, may now be attributed to a customer upon election of the customer, enabling the monetization of such data by both the customer and the businesses who can benefit from obtaining access to such data.

As noted above, each transaction that is recorded on the distributed ledger is associated with a key that uniquely identifies the customer if the customer has opted to release certain information to the merchant to participate in a loyalty program (scenario 100A of FIG. 1A). Where the customer has not opted in (scenario 100B of FIG. 1B), the transaction is associated with other information that may be used to claim the transaction should the customer later opt in. For example, where a customer 102 uses a device 106 to conduct the transaction, information such as one or more of the following may be recorded with each transaction (collectively referred to herein as "device information" or "user agent information"):
- user agent such as type of browser used on the device 106 to access the merchant's website 104 (e.g. Google Chrome, Internet Explorer, Safari, Firefox, etc.);
- device type (e.g. iPhone, Android smartphone, and the particular model of the phone, etc.);
- monitor resolution of the device 106;
- IP (Internet Protocol) address of the device 106
- plug ins and/or details and settings of plugins;
- presence of trackers such as cookies or tracking pixels;
- browser history;
- time zone;
- time setting;
- operating system and version;
- content encoding;
- content language;
- cookies enabled;
- do not track setting;
- use of local storage on or off;
- use of session storage;
- ISP (Internet Service Provider);
- platform of the browser;
- use of adblock;
- other data points that may be released or be present to establish a unique individual; and
- the like.

If the customer later opts in, the device information functions as a key to locate transactions in the ledger that are associated with that customer. In some situations, different device information profiles may be associated with the same customer (e.g. where the customer uses different devices, or different browsers to make purchases from a merchant). In such cases, all device information profiles may be used to locate transactions in the ledger that have been made by the customer.

FIG. 1C illustrates the scenario 100C where the customer 102 later opts in, and uses their device 106 to access the merchant's website 104 to purchase a good or service. Similar components as FIG. 1A's scenario 100A and FIG. 1B's scenario 100B are referred to using similar reference numerals. Each recorded transaction in scenario 100C is compared with the device information to determine whether there are any matches, which would indicate that the recorded transaction could have been made by customer 102. Thus, at the customer's election, customer 102 can retrieve and claim their previous transactions from the distributed ledger using the device information, and as part of the opt-in, authorize the release of this information to third parties, such as the merchant. Going forward, the customer may also authorize the association of future transactions with their key, by recording the transaction information with their key (scenario 100A of FIG. 1A), instead of or in addition to recording the transaction information with device information (scenario 100B of FIG. 1B).

Particular embodiments of the invention may be implemented by blockchain technology which is operated over a peer-to-peer (P2P) network that is used to support a distributed ledger to record transactions between Internet users (e.g. the "customers", "consumers" or "clients") and Internet websites (e.g. "advertisers" or "merchants"). Blockchain technology is used for the storage and retrieval of activities comprising internet browsing, searches, viewing, interaction (such as commenting, liking, posting, sharing or other social media engagement), purchasing activity and other transactions between the users and websites (individually a "transaction", and collectively, the "transactions"). FIG. 2 shows a distributed computing system 110 which may be used to provide the distributed ledger for recording these transactions. Distributed computing system 110 comprises a P2P network of a plurality of nodes 112. Nodes 112 are configured to communicate with each other over a communication network 108. While only a few representative nodes 112A, 112B and 112C are illustrated in FIG. 2, it should be understood that any number of nodes 112 may be interconnected to form distributed computing system 110, and the number of nodes N in the P2P network can fluctuate as nodes 112 are added or removed. Each node 112 may be any device that is capable of processing data. Nodes 112 may include, for example, desktop or laptop computers, or specialized processors including graphics processing units (GPU), field programmable gate array (FPGAs) and application specific integrated circuits (ASICs). Nodes 112 may also include mobile devices, Internet of Things (IoT) devices or home appliances, set-top boxes, smartphones, tablets and smart watches, or any other cellular-enabled, WiFi-enabled, or Bluetooth-enabled device which is capable of processing data and is operable to connect with the network 108.

While FIG. 2 shows a single communication network 108 interconnecting the nodes 112 of distributed computing system 110, it is to be understood that communication between nodes 112 can take place across a plurality of networks, including a combination of public and private networks. For example, if a node 112 is a desktop or laptop computer or an IoT device or home appliance or set-top box, data communicated from node 112 may be transmitted over a data link that traverses the private network of a home or enterprise local area network (via WiFi, Ethernet, Bluetooth or other local network connection), and the private network managed by an Internet Service Provider (ISP), to a public network such as the Internet. Similarly, if a node 112 is a cellular-enabled device, data communicated from node 112 may be transmitted over a data link that traverses the private network managed by a mobile phone service provider, to a public network such as the Internet. Thus, any number of network systems which are operable to communicate with other network systems, can be provided as a communication network 108 to interconnect nodes 112 to form the overall distributed computing system 110 in which transactions are recorded.

Distributed computing system 110 and network 108 are part of a larger distributed computing environment 105 shown in FIG. 2, which may include one or more user devices 106 operated by their respective customers, and one or more server systems 116. Each of the server systems 116 is operable to provide an online transaction platform 104 through which customer 102 can purchase a good or service, or engage in some other transaction, such as browsing or searching the merchant's website. Devices 106 are in communication with server systems 116 over network 108. In addition, devices 106 and server systems 116 are in communication with distributed computing system 110 over network 108.

In particular embodiments, each of user devices 106, server systems 116 and nodes 112 are operable to execute instructions provided by relevant modules of a blockchain software application. A local copy of the blockchain software application may be stored in program memory of the user devices 106, server systems 116 and nodes 112. Alternately, all or at least part of the functions of the blockchain application may be made accessible to one or more of the user devices 106, server systems 116 and nodes 112 through a VPN (virtual private network) connection, remote desktop connection, a cloud, Software as a Service (SaaS) delivery, and the like. In a blockchain system, records of transactions are stored as blocks. The blockchain is organized so that entries can only be appended to the blockchain. The blockchain software application enables the user device 106 or server system 116 to generate a record of the transaction in the form of a block, and broadcast it to the P2P network (distributed computing system 110) through network 108.

Each of the nodes 112 receives the broadcast, and executes instructions provided by the blockchain software application to validate the record. If consensus among the nodes 112 is reached, each node 112 appends the record to its own copy of the blockchain ledger.

Each user can request, through the blockchain software application, a key which uniquely identifies the individual. The key may comprise an account key of the user. Personal information of the user may be associated with his or her key. This personal information may include, but is not limited to, user's first name and last name, an assigned user name (such as email, or social media handle or page or a pseudonym), address (residential and/or commercial address, or email address or URL), credit or debit card or other payment information, and other identifying information of the user. The personal information may also include device information or user agent information as described elsewhere herein. At the user's election, the user can authorize the release of its key, or some or all of the user's personal information, to an advertiser or merchant via their server system 116, for the purpose of recording transaction information on the distributed ledger or for retrieving transaction information from the distributed ledger. Transaction record keeping may be accomplished by: creating blocks for each transaction with the user's key, and broadcasting the blocks to a distributed computing system for validation and recording in the distributed ledger maintained by the distributed computing system. The creation and broadcasting of the blocks may be implemented through the execution of instructions provided by a blockchain software application as executed either by user device 106 or server system 116.

As a user may interact with merchants in a number of ways, embodiments of the invention described herein may be applied to record transactions in different situations where the user has opted in and has been assigned a key. Where the user identifies himself or herself to the merchant with their key, examples of transactions which may be recorded with the user's key include:

a point of sale purchase at a brick and mortar store;
the user visits a brick and mortar store, but does not make a purchase at the store during the visit;
the user's browsing activity on the merchant's online stores or sites;
the user's purchasing activity on the merchant's online stores; and
the user refers other potential customers to the merchant's store by bringing them to the brick and mortar location or by referring them to the merchant's online stores or properties; as there is value in visitation and in actual purchasing the referral may be recorded using the user's account key.

Where the user has not elected to opt in, particular embodiments of the blockchain software application allows either the user or the advertiser or merchant site to record the transaction to the blockchain ledger with only the device information or user agent information associated with the transaction. The device information or user agent information does not contain any personal information of the user such as the customer name, address or payment information. Recording device information with the transaction will enable a specific user to later claim their transaction history using their device information as a key to locate the relevant records. The transaction history may include, for example, browsing activity and purchasing activity of the user. The user can authorize the release of their claimed transaction history to a particular merchant or advertiser (for example, if the user wishes to participate in a customer loyalty program). The ability to opt-in at a later date puts the user in control of their transaction history.

Figure 3:
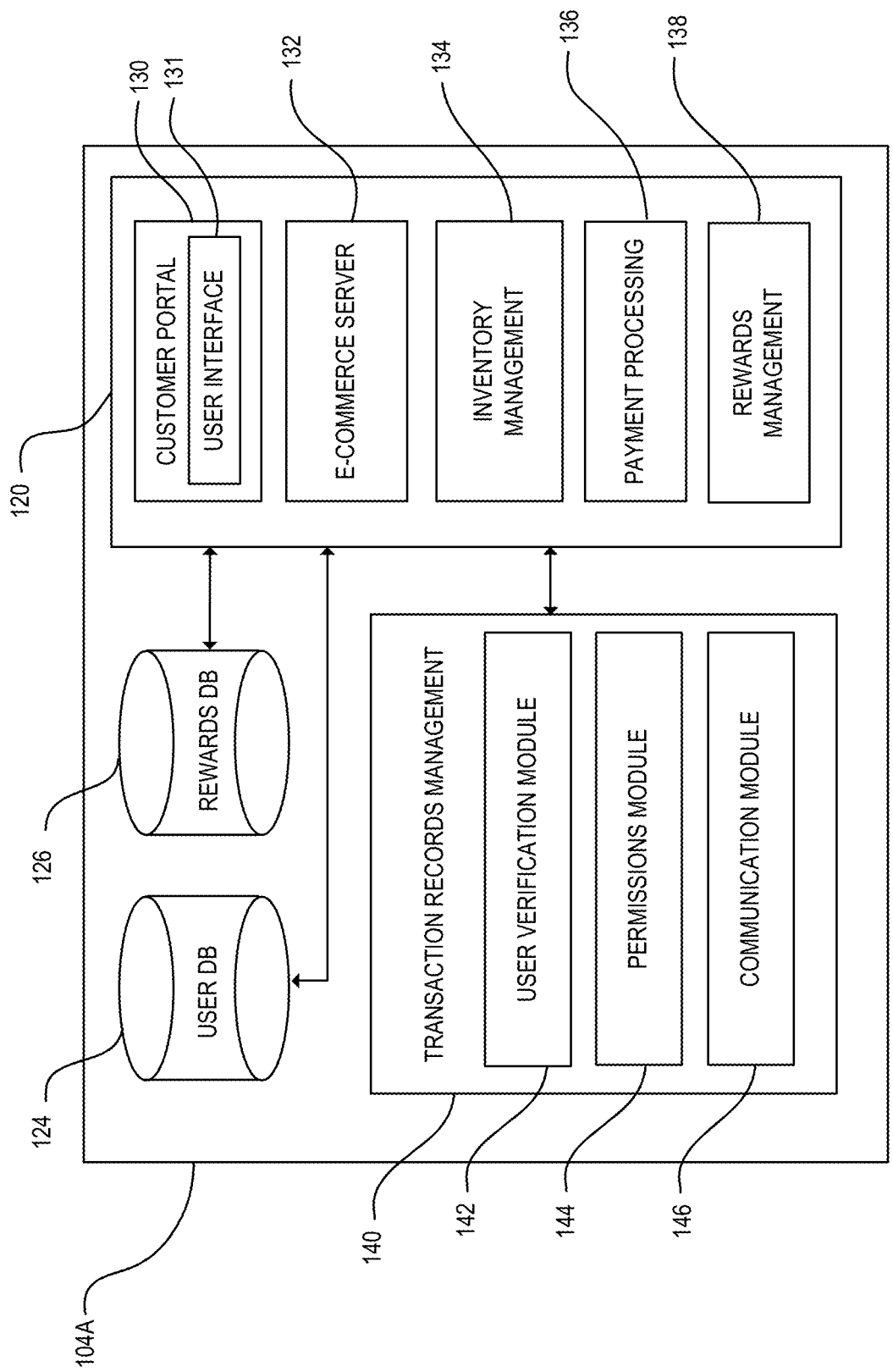
FIG. 3 is a schematic diagram of a system for an online transaction platform in accordance with one embodiment.

FIG. 3 illustrates a system 104A for implementing an online transaction platform in accordance with one embodiment. Online transaction system 104A may be in communication with a distributed computing system, such as the distributed computing system 110 shown in FIGS. 1 and 2, which is employed to provide a distributed ledger for recording transactions. Online transaction system 104A comprises a transaction subsystem 120 for handling the transaction with a user (customer, client) through the user's device 106, and a transaction records management subsystem 140 for receiving and verifying information associated with the user and the transaction, and broadcasting such information to the distributed computing system. While the transactions are recorded by the distributed computing system (e.g. on the distributed ledger or blockchain as described elsewhere herein), online transaction system 104A may comprise user data storage 124 for storing information concerning the users who have interacted with the system 104A. For example, user data storage 124 may be used to store user information, including the customer profiles of users who have opted in to the loyalty program. These customer profiles may include a specification of the particular permissions that each user has granted with respect to the use of their customer data. The customer profiles may also include other information of the user that the user has consented to providing, such as personal information of the user. Online transaction system 104A may further comprise rewards data storage 126 to store information related to rewards points that are earned and redeemed by users, based on transactions associated with or claimed by the users. For example, each customer may be associated with a rewards profile including the number of rewards points held by a customer, and rewards previously redeemed. These rewards profiles may be stored in rewards data storage 126.

Transaction subsystem 120 comprises various servers, modules and/or components for handling the transaction between a user and the merchant. The user may interact with transaction subsystem 120 through their user device 106, which connects to the transaction subsystem 120 over a network 108 (see FIGS. 1 and 2). In the illustrated embodiment of FIG. 3, transaction subsystem 120 comprises a customer portal 130 for interfacing with the user. For example, customer portal 130 may deliver a webpage to a browser on the user device 106 wherein the webpage provides a user interface 131 for the user to engage in a transaction (e.g. search or browse for products, or add a product to a shopping cart and checkout to purchase the product). Transaction subsystem 120 also comprises other servers, modules and/or components necessary for completing a transaction with the user. In the illustrated embodiment, transaction subsystem 120 comprises: an e-commerce server 132 for facilitating functions for online shopping (e.g. display or advertise products, shopping cart, checkout), inventory management module 134 to manage and track the products that are available for sale by the merchant, payment processing module 136 to handle the payment associated with a purchase, and a rewards management module 138 to manage the accumulation and redemption of rewards points, and to analyse transaction data and customers' rewards profile data to identify rewards or other incentives to present to the customer.

Transaction records management subsystem 140 comprises various modules for receiving and verifying information associated with the user and the transaction, and communicating such information to the distributed computing system. In the illustrated embodiment of FIG. 140, such modules include a user verification module 142 to identify whether a user has opted in, permissions module 144 to ascertain what information the user has consented to disclosing to the blockchain, and how the information is to be associated with the user, and a communications module 146 to generate blocks for the customer transactions and broadcast them to the distributed computing system. These modules' functions are discussed in further detail below with reference to FIG. 4.

Figure 4:
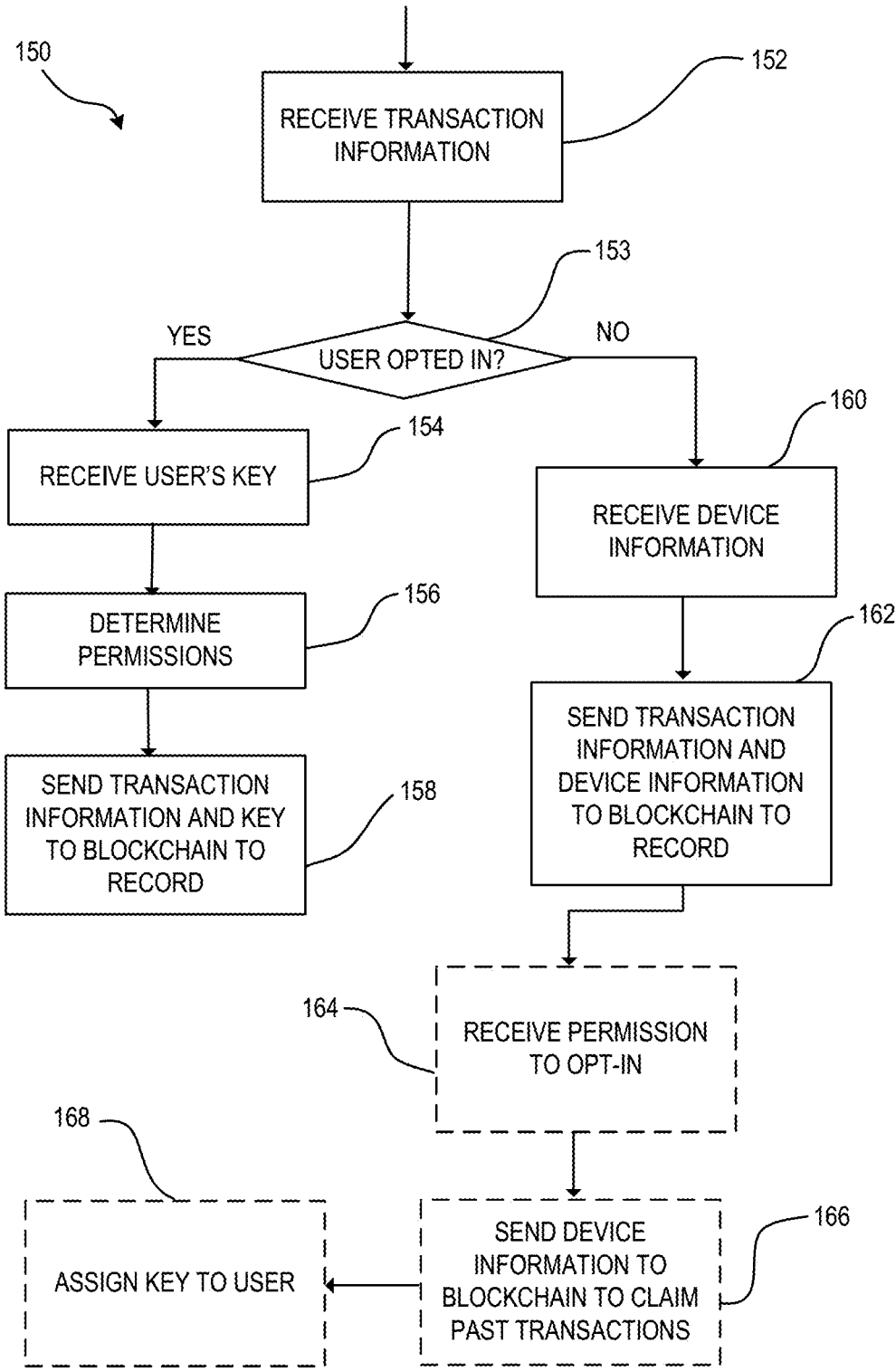
FIG. 4 is a flowchart of a method that may be implemented by the transaction records management subsystem of an online transaction platform in accordance with one embodiment.

FIG. 4 shows a method 150 that may be implemented by the transaction records management subsystem 140 of FIG. 3. Method 150 begins at step 152 by receiving transaction information from the transaction subsystem 120. At step 153, method 150 proceeds by determining whether the user has opted in. For example, for applications described herein in the context of loyalty programs, the user can opt in and release their transaction data to a merchant in exchange for rewards offered by the merchant. The determination at step 153 may be made by a user verification module 142 of transaction records management subsystem 140. The user verification module 142 may prompt the user to indicate whether they have opted in, or prompt the user for a key or other identifying information; this information may then be matched against the information in a user database 124 to determine whether the user has opted in. If the user has opted in, then the user's key is received at step 154, if it has not already been provided as part of the opt-in determination made at step 153.

Permissions associated with the use of customer data are received at step 156 of method 150. For example, the user may consent to only their key (and no other identifying information) being passed with the transaction information to the blockchain. Step 156 may be implemented by a permissions module 144 obtaining permissions directly from the user, or by retrieving the customer profile from user data storage 124. Based on these permissions, some of the transaction information and/or user identifying information is excluded before the transaction is communicated to the blockchain at step 158 of method 150. The information may be filtered by the transaction subsystem 120 or by the transaction records management subsystem 140 applying the conditions set by the permissions. At step 158, the transaction information is communicated. Step 158 may be implemented by communication module 146 of FIG. 3's transaction records management subsystem 140. In particular, communication module 146 generates a block for the transaction with the user's key, and broadcasts the block to the blockchain. The transaction is then validated and recorded with the user's key on the distributed ledger.

If at step 153 of method 150 it is determined that the user has not opted in, then method 150 proceeds to step 160 by obtaining the device information associated with the user device 106. Device information and transaction information are communicated to the blockchain at step 162. Step 162 may be implemented by communication module 146 of FIG. 3's transaction records management subsystem 140. In particular, communication module 146 generates a block for the transaction with the device information, and broadcasts the block to the blockchain. The transaction is then validated and recorded with the device information on the distributed ledger.

Method 150 illustrates an optional step 164 to be taken by a user who has not yet opted in. If a user decides to opt in at step 164, they may consent to associate themselves with their transaction information, and to provide all or a portion of that information to select merchants. After opting in, a user may choose to claim past transactions at step 166. This may be accomplished by the communication module 146 sending device information to the distributed ledger to locate transactions that have been recorded with such device information. Transaction information may be claimed by associating it with the user, and updating the distributed ledger by creating new records associating the previous transactions with a key of the user. If the user does not already have a key, then a key may be assigned to the user at step 168. As the user has now opted in, method 150 then repeats steps 152 to 158 for any further transactions made by the user.

It is recognized that the claiming of past transactions using device information may result in the possibility of more than one different user having identical device fingerprint information. In such situations, the merchant who is being provided with this information is advised of the potential for a false positive resulting from transactions which could be matched to any one of a plurality of users. Rules may be established to weight the transactions, disregard the transactions, and/or to contact users directly to confirm their transaction. Alternately, a rule may be established that does not allow these transactions to be claimed by either user.

Particular advantages of embodiments of the methods and systems described herein include, for example:

through the decentralization of record keeping and data management and by providing each user with a key and the ability to grant permissions concerning their data, customers are provided with more control over their customer data (e.g. whether to release the data; what information to release; how the data is associated with the customer data; and how the information may be used by other parties).
  by capturing and retrieving a user's past transaction data, a new market is created for the use of such data; the customer and the merchant are able to share in the benefits of monetizing past transaction data, which may be recovered and claimed using device information as described herein.
  protecting customer privacy even while the customer is participating in loyalty programs, as the customer is associated with their transaction data through their key, without having to disclose the customer's full identity.
  providing for an immutable and decentralized ledger wherein new transaction records may be added only upon validation and consensus of the nodes of a P2P network.

Other advantages of the above-described methods and systems are discussed elsewhere herein.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. A method for recording a transaction between a user and a transaction system on a distributed ledger maintained by a distributed computing system, the distributed ledger comprising a blockchain, the method comprising:
  receiving transaction information for the transaction from a transaction subsystem of the transaction system, the transaction subsystem interfacing with a user device of the user to facilitate the transaction;
  identifying whether the user has elected to opt in to a loyalty program of the transaction system;
  where the user has opted in to the loyalty program, receiving an assigned key for the user, and transmitting the transaction information and the key to the distributed computing system for validation and entry on the distributed ledger;
  where the user has not already opted in to the loyalty program, receiving device information associated with the transaction, and transmitting the transaction information and the device information to the distributed computing system for validation and entry on the distributed ledger, wherein transmitting the transaction information and the device information to the distributed computing system comprises generating a block with the transaction information and the device information, and broadcasting the block to the distributed computing system, and using the device information to locate records of past transactions by the user on the distributed ledger.

2. The method of claim 1, wherein transmitting the transaction information and the key to the distributed computing system comprises generating a block with the transaction information and the key, and broadcasting the block to the distributed computing system.

3. The method of claim 1 comprising, where the user has not already opted in to the loyalty program, assigning a new key to the user, upon the user electing to opt in to the loyalty program.

4. The method of claim 3 comprising associating the located records of past transactions with the new assigned key of the user.

5. The method of claim 1 comprising obtaining a set of permissions associated with the transaction information, and applying the set of permissions to filter the transaction information prior to transmitting it to the distributed computing system.

6. A system for recording a transaction between a user and a transaction system on a distributed ledger maintained by a distributed computing system, the distributed ledger comprising a blockchain, the system comprising:
  a user verification module operable to identify whether the user has elected to opt in to a loyalty program of the transaction system;
  a permissions module operable to ascertain a set of permissions associated with transaction information of the transaction, and apply the set of permissions to filter the transaction information prior to communicating it to the distributed computing system; and
  a communications module operable to transmit the transaction information to the distributed computing system for validation and entry on the distributed ledger maintained by the distributed computing system;
  wherein the communications module is configured to receive device information associated with the transaction, and transmit the transaction information and the device information to the distributed computing system for validation and entry on the distributed ledger, wherein the communications module is configured to transmit the transaction information and the device information to the distributed computing system by generating a block with the transaction information and the device information, and broadcasting the block to the distributed computing system;

wherein the device information is used by the distributed computing system to locate records of past transactions b the user on the distributed ledger.

7. The system of claim 6 wherein the communications module is configured to receive a key for the user, and transmit the transaction information and key to the distributed computing system for validation and entry on the distributed ledger.

8. The system of claim 7 wherein the communications module is configured to transmit the transaction information and the key to the distributed computing system by generating a block with the transaction information and the key, and broadcasting the block to the distributed computing system.

* * * * *